UNITED STATES PATENT OFFICE.

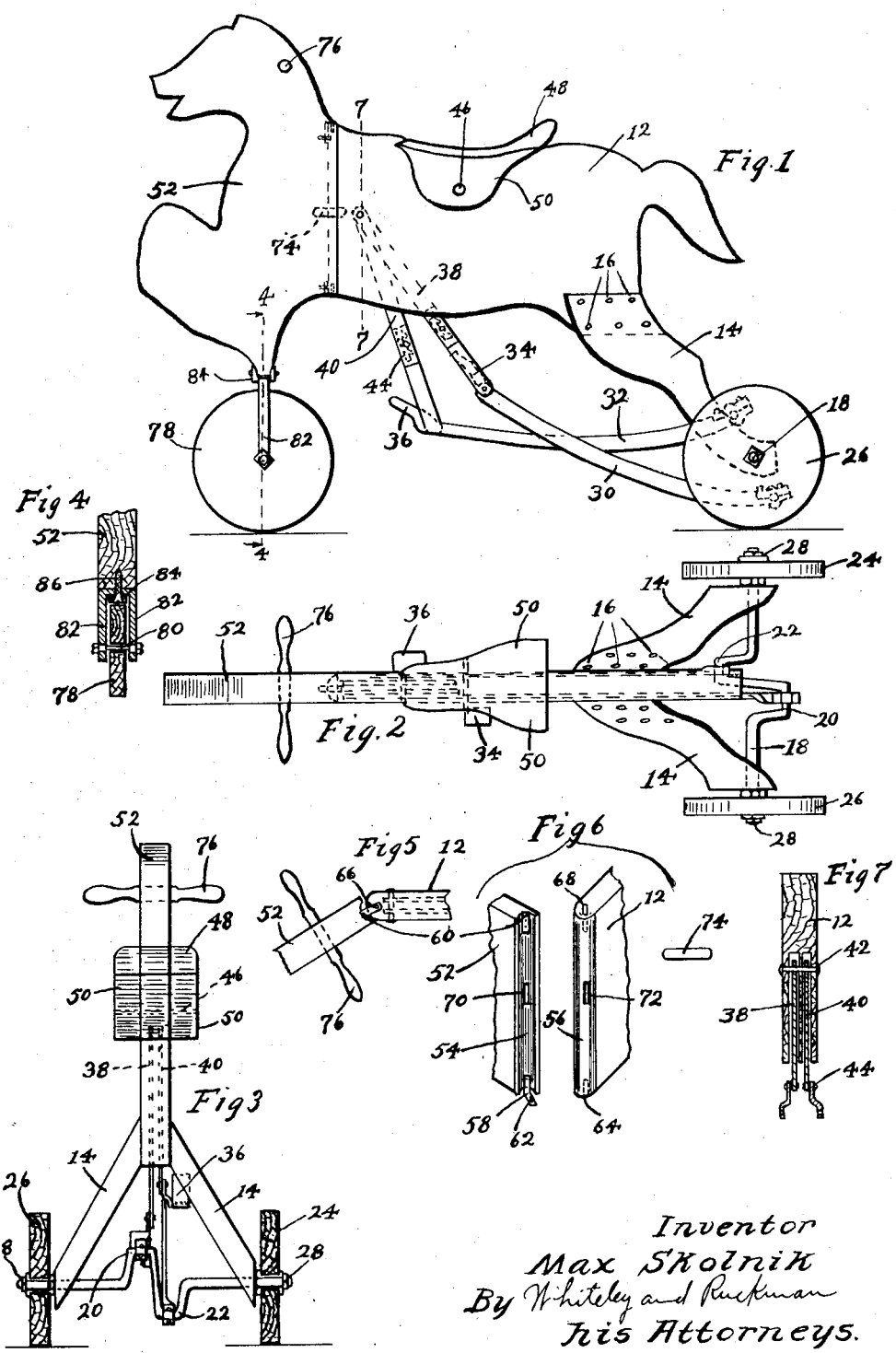

MAX SKOLNIK, OF MINNEAPOLIS, MINNESOTA.

CHILD'S VEHICLE.

1,348,326.  Specification of Letters Patent.  Patented Aug. 3, 1920.

Application filed April 21, 1919. Serial No. 291,544.

*To all whom it may concern:*

Be it known that I, MAX SKOLNIK, a citizen of the United States, residing at Minneapolis, in the county of Hennepin and State of Minnesota, have invented certain new and useful Improvements in Children's Vehicles, of which the following is a specification.

My invention relates to a child's vehicle and the object is to provide a device of this kind which will not only be attractive in appearance and thus be pleasing to the child, but which may be readily propelled and guided by the child without particular danger of falling off, and which is also easy to steer.

The full objects and advantages of my invention will appear in connection with the detailed description thereof and the novel features embodied in my inventive idea will be particularly pointed out in the claim.

In the drawings,—

Figure 1 is a view in side elevation. Fig. 2 is a top plan view. Fig. 3 is a rear elevational view with the driving wheels in section. Fig. 4 is a view in section on the line 4—4 of Fig. 1, but showing a smaller steering wheel. Fig. 5 is a detail top plan view. Fig. 6 is a detail view of detached parts showing a hinged construction. Fig. 7 is a view in section on the line 7—7 of Fig. 1.

Referring to the particular construction shown in the drawings, the main body member 12, preferably of wood, is shaped to simulate a horse or pony, rear diverging leg members 14 being secured to the body member by pins or other fasteners 16. The lower ends of these leg members constitute bearings for a crank-shaft 18 having the crank portions 20 and 22 positioned at one hundred and eighty degrees from each other. The ends of the crank-shaft are screwthreaded and secured by nuts 28 on the outer ends of the crank-shaft. The nuts turn down upon driving wheels 24 and 26, having holes through their centers through which the ends of the shaft extend. Operating bars 30 and 32 have their rear ends surrounding the cranks 20 and 22 respectively, and the forward ends of these bars are provided with pedals 34 and 36. The lower ends of links 38 and 40 are pivotally attached to the operating bars near the pedals, and the upper ends of the links are pivotally attached to a rod 42 passing through the main body portion near its forward end. The links extend up within slots in the body portion as shown in Fig. 7, and the links near the lower ends thereof may be adjusted by means of a slot-and-bolt connection 44 so that the pedals can be raised or lowered to suit the child. The links 38 and 40 are each made in two parts, having their adjacent ends overlapped and adjustably secured together by a bolt passing through slots in the overlapped ends in a well known manner. A saddle is secured to the main body portion by a fastener or pin 46, and the saddle member is composed of a top portion 48 the under side of which is cut to fit upon the top of the main body portion and two side members 50 which depend from and are glued to the top portion 48 so as to extend downwardly on the sides of the body portion. By means of this construction the saddle is firmly held in place and if it should become damaged is readily replaced by another saddle. The front of the vehicle is constructed and supported in the following manner. A member 52 has its rear portion concaved at 54 to fit over the convex front end 56 of the main body portion, and angle irons 58 and 60 are secured at the bottom and top respectively of the concave portion 54. The angle iron 58 has an upstanding pin 62 to fit into a hole 64 in the front bottom portion of the member 12, and the angle iron 60 has a hooked notch 66 to fit over a pin 68 secured to the front top portion of the member 12. By this means the front member 52 is hinged to the body member 12 and the concave and convex portions are provided with recesses 70 and 72 in alinement with each other for receiving a leaf spring 74, so that the front member 52 is normally held in alinement with the body member 12. The member 52 is provided with a handle 76 extending out from each side for grasping by the hands of the rider whereby the front member may be swung relatively to the main body member as shown in Fig. 5, and may also be swung in the opposite direction for steering. When sidewise pressure on the handle is removed the spring 74 immediately returns the front member into alinement with the main body member. The lower portion of the front member is provided with a guiding or steering wheel 78 mounted on a short shaft 80 supported in depending arms 82 connected by a horizontal portion under which passes a strap member 84 secured to the lower portion of the front member 52. A screw 86 passing through this horizontal portion and also through the strap member 84 serves to securely hold the arms 82 in place.

The operation and advantages of my invention will be obvious from the foregoing description. The child when seated on the saddle may readily propel the vehicle by pushing on the pedals 34 and 36. His balance on the saddle is maintained by resting the hands upon the handle 76, while by exerting turning movement in the proper direction the vehicle is easily guided. If the child desires to travel in a straight forward direction no attention to the steering is necessary, since the spring 75 maintains the front hinged member in alinement with the main body member. The particular construction of the hinge and the mounting of the links 38 and 40 avoid likelihood of any portion of the child being pinched.

I claim:

A child's vehicle comprising a main body member, wheels upon which the rear of said body member is supported, a front member, the adjacent edges of said front and body members being concaved and convexed to fit together with a closed joint, angle irons secured to the top and bottom of one of said members adjacent said joint, pins secured to the top and bottom of the other member adjacent said joint, said pins and angle irons interfitting to hinge the two members together, a flat spring located in said members for normally keeping them in alinement with each other, and a guiding wheel for supporting said front member.

In testimony whereof I hereunto affix my signature.

MAX SKOLNIK.